(12) United States Patent
Ung et al.

(10) Patent No.: US 9,183,419 B2
(45) Date of Patent: Nov. 10, 2015

(54) PASSIVE RFID ASSISTED ACTIVE RFID TAG

(71) Applicant: The Boeing Company, Seal Beach, CA (US)

(72) Inventors: Kevin Y. Ung, Bellevue, WA (US); Craig Farris Battles, Seattle, WA (US); Brian James Smith, Seattle, WA (US); William David Kelsey, Issaquah, WA (US); Lindsey M. Caton, Camano Island, WA (US); Anil Kumar, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/732,894

(22) Filed: Jan. 2, 2013

(65) Prior Publication Data

US 2014/0183261 A1    Jul. 3, 2014

(51) Int. Cl.
*G06K 7/00*       (2006.01)
*G06K 19/07*      (2006.01)
*G06K 19/077*     (2006.01)

(52) U.S. Cl.
CPC .......... *G06K 7/0008* (2013.01); *G06K 19/0702* (2013.01); *G06K 19/07749* (2013.01)

(58) Field of Classification Search
USPC ................. 235/439; 340/572.8, 10.1
See application file for complete search history.

(56) References Cited

U.S. PATENT DOCUMENTS

| 5,952,922 | A | 9/1999 | Shober |
|---|---|---|---|
| 5,959,568 | A | 9/1999 | Woolley |
| 7,551,086 | B2 | 6/2009 | Coop et al. |
| 8,040,221 | B2 | 10/2011 | Murray et al. |
| 2007/0085688 | A1 | 4/2007 | Zhu et al. |
| 2007/0262849 | A1* | 11/2007 | Ismail ........................ 340/10.1 |
| 2008/0130604 | A1* | 6/2008 | Boyd ........................... 370/338 |
| 2009/0051536 | A1 | 2/2009 | Lahiri |
| 2009/0207024 | A1* | 8/2009 | Schatz et al. ............... 340/572.1 |
| 2009/0315679 | A1* | 12/2009 | Bauchot et al. ............. 340/10.1 |
| 2011/0163857 | A1 | 7/2011 | August et al. |
| 2011/0260923 | A1* | 10/2011 | Liao et al. .................... 342/458 |
| 2012/0268250 | A1* | 10/2012 | Kaufman et al. ........... 340/10.1 |
| 2013/0314534 | A1* | 11/2013 | Hinman et al. .............. 348/143 |

OTHER PUBLICATIONS

International Search Report and Written Opinion of International Application No. PCT/US2013/073769; Mar. 5, 2014; 14 pages.
International Preliminary Report on Patentability and Written Opinion of the International Searching Authority for International Application No. PCT/US2013/073769, Jul. 7, 2015, 9 pages.

* cited by examiner

*Primary Examiner* — Thien M Le
*Assistant Examiner* — Asifa Habib
(74) *Attorney, Agent, or Firm* — Armstrong Teasdale LLP

(57) ABSTRACT

A radiofrequency identification (RFID) device includes an active RFID tag that includes a power source and a passive RFID tag reader, the passive RFID tag reader electrically coupled to the power source of the active RFID tag.

20 Claims, 4 Drawing Sheets

US 9,183,419 B2

PASSIVE RFID ASSISTED ACTIVE RFID TAG

BACKGROUND OF THE DISCLOSURE

The field of the disclosure relates generally to radiofrequency identification (RFID) systems. More particularly, the present disclosure relates to passive RFID assisted active RFID tags and methods therefor.

RFID is a technology that allows a wide range of objects to be identified, tracked and managed. RFID technology is based on the use of small radio tags or transponders and readers/encoders for connection to an information system. These RFID tags, which contain a unique code together with other additional information, can be read by the reader/encoder from a distance without contact or line-of-sight. Typical RFID are categorized as either active or passive.

Active RFID tags are typically powered by an internal battery and may include read/write functionality (i.e., tag data can be rewritten and/or modified). An active RFID tag's memory size may vary according to application requirements. In a typical active RFID system, the RFID tag might periodically transmit its data, including a part number and location to a central tracking database. The battery-supplied power of an active tag generally gives it a longer read range than a passive RFID tag. However, active RFID tags result in greater size, greater cost, and an operational life limited to about 10 years depending on operating temperatures and battery type, as compared to passive RFID tags. Additionally, active RFID tags are typically not suitable for indoor use, due to limitations and inherent unreliability of using traditional received signal strength indicators (RSSI) and time distance of arrival (TDOA) calculations.

Passive RFID tags operate without an internal power source. The passive RFID tags obtain operating power from the electromagnetic transmissions generated by the reader. Consequently, passive tags may be much lighter than active tags, less expensive, and offer a virtually unlimited operational lifetime. Passive tags are typically read-only and are programmed with a unique set of data that cannot be modified. However, passive tags may also be read/write tags that are initially programmed with a unique set of data and such data may be modified and updated at desired intervals. In order to operate, the passive tag reader must initiate the communication to the tag, and the tag then responds with its identifier. Typically, to obtain the location of the passive tag, the reader may use a combination of previous known location of the tag, RSSI and TDOA between the tag and reader, triangulation antenna gain measurement. Thus, passive RFID tags generally result in more accurate location of the tags as compared to active tags. Although cheaper and smaller than active tags, passive tags have shorter read ranges than active tags and require a higher-powered reader.

The advantage of RFID systems is the non-contact, non-line-of-sight nature of the technology. Tags can be read through a variety of substances, including metal, where barcodes or other, traditional optically read technologies would be impractical.

BRIEF DESCRIPTION OF THE DISCLOSURE

In one aspect, a radiofrequency identification (RFID) device includes an active RFID tag that includes a power source and a passive RFID tag reader, the passive RFID tag reader electrically coupled to the power source of the active RFID tag.

In another aspect, a method of determining the location of an object coupled to a radiofrequency identification (RFID) device includes interrogating a passive tag using a passive RFID tag reader and receiving electronic product code (EPC) data from the passive tag. The EPC data is transmitted to an active RFID tag that is coupled to the passive RFID tag reader. The EPC data and active RFID tag data are transmitted from the active RFID tag to an active RFID tag reader. The location of the object is determined using the EPC data and active RFID tag data.

In yet another aspect, a system for determining the location of an object using radiofrequency identification (RFID) includes an RFID device having an active RFID tag that includes a power source. The device also includes a passive RFID tag reader electrically coupled to the power source of the active RFID tag. The RFID device is configured to output electronic product code (EPC) data received from the passive RFID reader and tag identification (TID) data of the active RFID tag. An active RFID reader is configured to receive the outputted EPC data and TID data and determine a location of the RFID device based upon the received EPC data and active RFID data.

DETAILED DESCRIPTION OF THE DISCLOSURE

Figure 1:
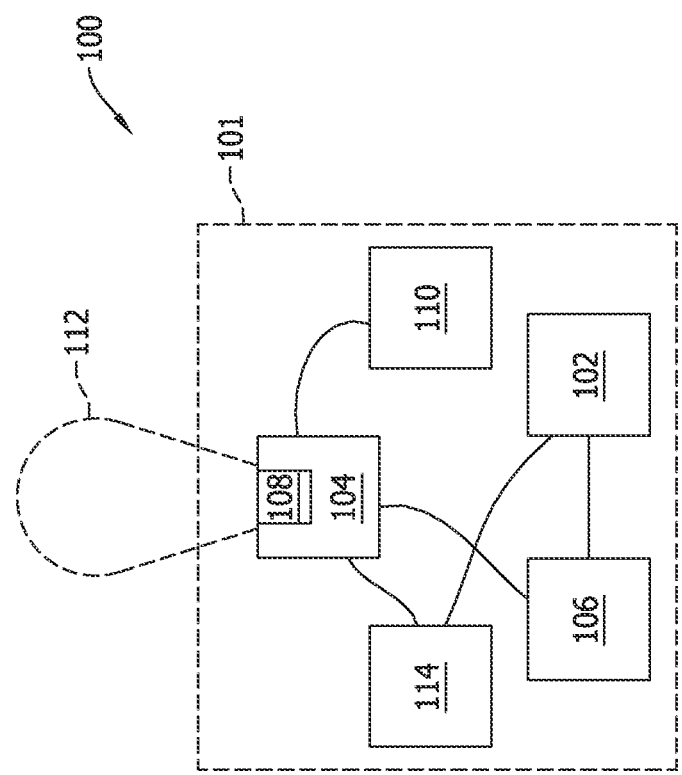
FIG. 1 is a schematic showing an implementation of an RFID device according to an implementation.

FIG. 1 is a schematic diagram showing one implementation of an RFID device 100. The RFID device 100 includes an active RFID tag 102 and a passive RFID tag reader 104. Active RFID tag 102 is powered by a power source 106 to which it is in electrical communication with. In one implementation, power source 106 is a battery, but power source 106 may be any electrical power source that allows the RFID device to function as described herein. In one implementation, each component of RFID device 100 is contained within a single integral housing 101.

Passive RFID tag reader 104 is in electrical communication with power source 106. As such, power source 106 may supply electrical power to both passive RFID tag reader 104 and active RFID tag 102. In one implementation, power source 106 is sized to provide simultaneous electrical power to adequately power passive RFID tag reader 104 and active RFID tag 102. Passive RFID tag reader 104 may be a transceiver having transmit and receive capabilities. In this implementation, passive RFID tag reader 104 includes an antenna 108 configured for sending and receiving data. Antenna 108 may be an omnidirectional antenna or a directional antenna. In one implementation, antenna 108 is mechanically and/or electrically connected to an orientation device 110 capable of orienting (i.e., steering) the direction of signal 112 transmitted from antenna 112 and a signal received by the antenna 108. In some implementations, the orientation device 110 is a motor, actuator, servo or the like capable of steering the direction of the antenna signal. In yet another implementation, antenna 108 is an electronically steerable antenna, such that physical movement of the antenna is not necessary.

Passive RFID reader 104 is configured to transmit signal 112 for interrogating passive RFID tags. The strength of signal 112 is adjustable by way of a power control device (not shown), which may be integral with passive RFID reader 104. Signal 112 is configured to be received at a passive RFID tag 208 (FIG. 2), and to initiate communication with the passive RFID tag. When the passive RFID tag receives the signal 112, the passive RFID tag will transmit a response including electronic product code data back to the passive RFID tag reader 104. Electronic product code (EPC) data may include a serial number, location, unique identifier or other characteristic information of a structure to which it is coupled to, and as further described below.

In another implementation, RFID device 100 includes a detector 114. Detector 114 is configured to detect an object, mark or condition, such as a location marker, barcode or orientation of the detector, or the like, based upon a location of the RFID device. The detector 114 is configured to output location data to at least one of passive RFID tag reader 104 and active RFID tag 102 based upon the detected object, mark or condition. For example, detector 114 may be a gyroscope, proximity detector, optical scanner or other detection device capable of detecting a condition and outputting location data based upon the detected condition. For example, in one implementation, detector 114 is an optical detector that optically scans, or detects, a barcode or other condition at a location. The detector 114 is capable of reading such barcode and outputting location data relating to the barcode. In such implementations, the detector 114 may be used to fine tune determining the location of RFID device 100. For example, in one aspect, the fine tuning may be implemented by the detector 114 being used to detect a proximity to a wall or other structure, and then based upon the proximity to the structure, strength of signal 112 is adjusted. In such implementation, the strength of the signal 112 may be increased or decreased such that only passive RFID tags 208 within a desired range are interrogated. In yet other implementations, signal 112 may be adjusted based upon the detected object, mark or condition by detector 114.

Each active RFID tag 102 includes unique tag identification (TID) data. The TID data is similar to the EPC data of the passive RFID tags 208. For example, the TID data may include a serial number, location data, unique identifier or other characteristic information of a structure to which it is coupled to.

Figure 2:
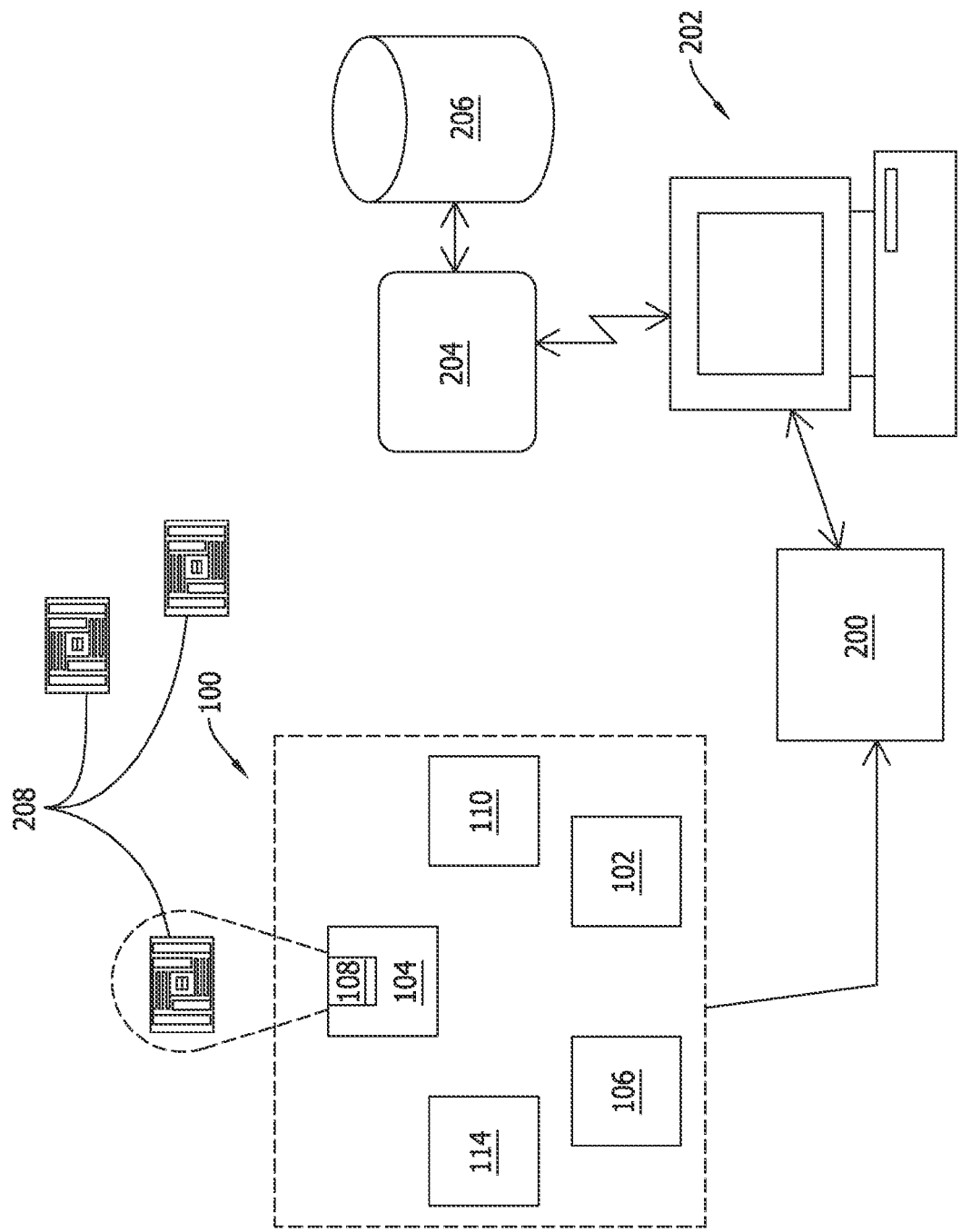
FIG. 2 is a schematic showing an implementation of an RFID system according to the present disclosure.

Referring now to FIG. 2, an implementation of an RFID system is shown. In this implementation, RFID device 100 is in communication with an active RFID reader 200. In some implementations, active RFID reader 200 is in communication with a computer 202, which may be in communication with an RFID tag location engine 204 and a location database 206. As used herein, "in communication" refers to any form of data communication such as, for example, wired or wireless electronic data communication, such as Wi-Fi, Bluetooth or the like.

In the exemplary implementation, RFID device 100 is configured such that passive RFID tag reader 112 is capable of communicating with (i.e., reading) passive RFID tags 208. In some implementations, passive RFID tags 208 are in predetermined, or known, locations that are stored within the locations database 206, which is searchable by locations engine 204.

Figure 3:
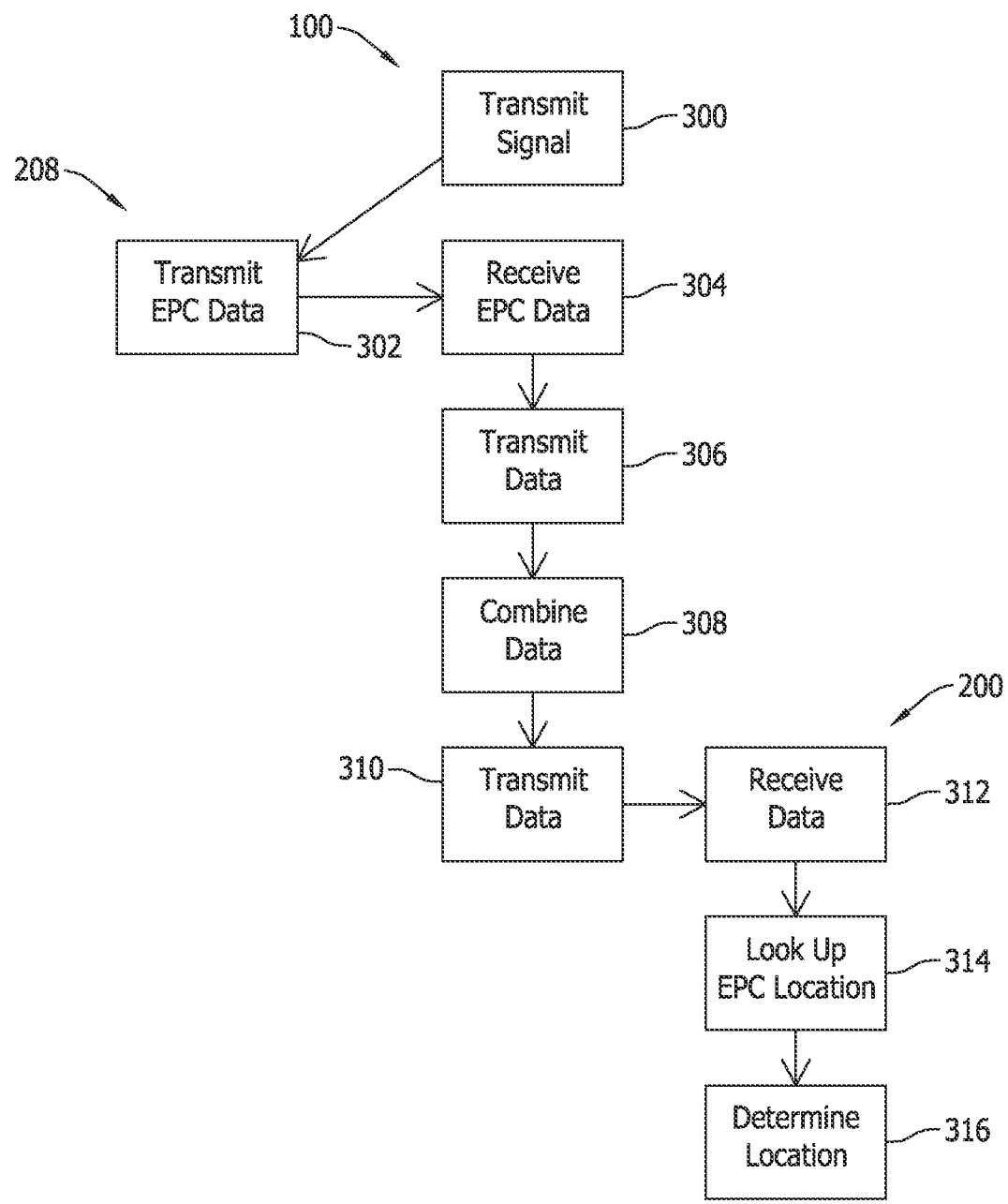
FIG. 3 is flow diagram showing a method according to an implementation.

Reference is now made to FIGS. 2 and 3. In one implementation, RFID device 100 is coupled to an object, e.g. a cart, tool, storage bin or other portable carriage (not shown), present in an environment, e.g. a manufacturing environment, a manufacturing line, or the like. In the exemplary implementation, the cart including the RFID device 100 is movable within the manufacturing environment. Passive RFID tag reader 104, which draws its power from power source 106, transmits signal 112 at step 300 to initiate communication with (i.e., interrogate) one or more passive RFID tags 208. When the signal reaches a passive RFID tag 208, the passive RFID tag 208 returns EPC data back to the passive RFID tag reader 104 at step 302. The passive RFID tag reader 104 can be configured to interrogate passive RFID tags 208 within a predetermined distance from passive RFID tag reader 104 by adjusting the transmission power of signal 112 and/or by adjusting the orientation of antenna 108. In one such implementation, signal 112 is continuously transmitted by antenna 108. In other implementations, signal 112 is transmitted at one or more discreet time intervals, which may be user programmed.

At step 304, the passive RFID tag reader 104 receives the EPC data from at least one passive RFID tag 208. Afterward, at step 306 the passive RFID tag reader 104 then transmits the received EPC data to active RFID tag 102. Active RFID tag 102 transmits the active RFID tag 102 TID data and the received EPC data from passive tag 208 to the active RFID tag reader 200. In one implementation, active RFID tag 102 is configured to combine, at step 308, the active tag 102 TID data and the received EPC data from passive tag 208 into a combined data file before transmitting, at step 310, the data to the active tag reader 200.

The active tag reader 200 receives the data (i.e., the combined data file) from active RFID tag 102, at step 312. The active tag reader 200 then uses the received data to look up the last known location of passive RFID tag 208, at step 314. For example, step 314 may include transmitting the EPC data to computer 202, which utilizes location engine 204 to look up the last known location of passive RFID tag 208 within the locations database 206.

At step 316, the active RFID tag reader 200 or computer 202 augments the tag identification (TID) data of the active RFID tag 102 with the location data retrieved at step 314 to determine a location of RFID device 100, based on a combination of the TID data and the EPC data. Accordingly, the location of RFID device 100 may be determined based upon both the TID data of active tag 102 and the EPC data of one or more passive RFID tags 208, thereby resulting in a more accurate determination of location of the RFID device, as opposed to a location determined by only the TID data or the EPC data alone.

In one exemplary implementation, passive RFID tags 208 are placed at known locations to serve as a landmark to assist in determining the location of a movable RFID device 100. For example, passive RFID tags 208 may be placed at known environment locations, such as aisle entrances to supermarket lanes, or at different station locations of a manufacturing line. The locations of the passive RFID tags 208 are then stored in locations database 206. In this implementation, an RFID device 100 is then coupled to an object, e.g. a cart, located within the environment. The strength of signal 112 is adjusted to a predetermined level that allows passive RFID reader 104 to interrogate passive RFID tags 208 only within a predetermined distance. In the exemplary implementation, the passive RFID tag reader 104 is configured to transmit signal 112 at a predetermined time interval, and record any received EPC data from tags 208 internally within a memory of passive RFID tag reader 104. The EPC data is then transmitted to the active RFID tag 102. In this implementation, active RFID tag 102 is a Wi-Fi enabled tag and transmits its TID data and the received EPC data to computer 202 which is part of the Wi-Fi network. The computer 202 utilizes location engine 204 to look up the known locations of the passive RFID tags 208, and augment the calculation of the location of active RFID tag 102 in order to determine a location of RFID device 100. As such, the location of the RFID device and the object to which it is coupled to, may be determined with reference to the landmarks.

In another implementation, the RFID device 100 may be used to track the real-time location of an object, e.g. a cart, and items carried by the cart. As used herein, a cart may be any suitable moving storage, or carrying device, such as a shopping cart, tool cart or the like. In this implementation, an RFID device 100 is coupled to a cart (not shown). One or more items carried by the cart include a passive RFID tag 208 coupled thereto. The passive RFID tag reader 104 is configured such that signal 112 is transmitted at a power level to cover substantially only a distance occupied by the cart. In this implementation, signal 112 may be continuously or intermittently transmitted. As the items are placed onto the cart, or taken off the cart, the passive RFID tags 208 are interrogated such that passive RFID tag reader 104 receives a signal from the items carried by the cart. Each item including the passive RFID tag 208 that is carried by the cart returns its EPC data to the passive RFID tag reader 104 when interrogated. The passive RFID tag reader 104 records in its internal memory the EPC data of each passive RFID tag 208 carried by the items on the cart. The passive RFID tag reader 104 may then transmit the received EPC data to the active RFID tag 102. The active RFID tag 102 then transmits its TID along with the EPC data of the passive RFID tags 208 carried on the cart to computer 202, for example using the Wi-Fi enabled active tag communication method or the active RFID tag reader communication method described above. Computer 202 utilizes location engine 204 to record the EPC data within the locations database 206, to indicate that an item has been placed onto the cart. Similarly, when an item is taken off of the cart, the transmission from the passive RFID tag reader 104 to active RFID tag 102 will lack the EPC data of the passive tag of the item taken off of the cart. As such, the EPC data of the removed item is not transmitted to the computer 202, and the location engine 204 thus indicates in locations database 206 that such item has been removed from the cart.

Figure 4:
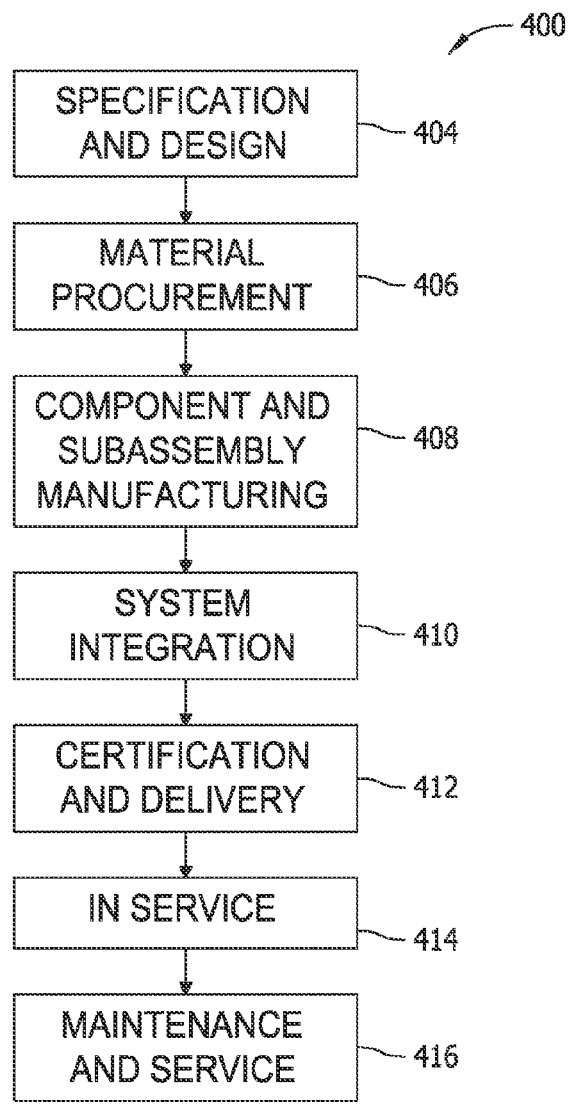
FIG. 4 is a flow diagram of aircraft production and service methodology.
Figure 5:
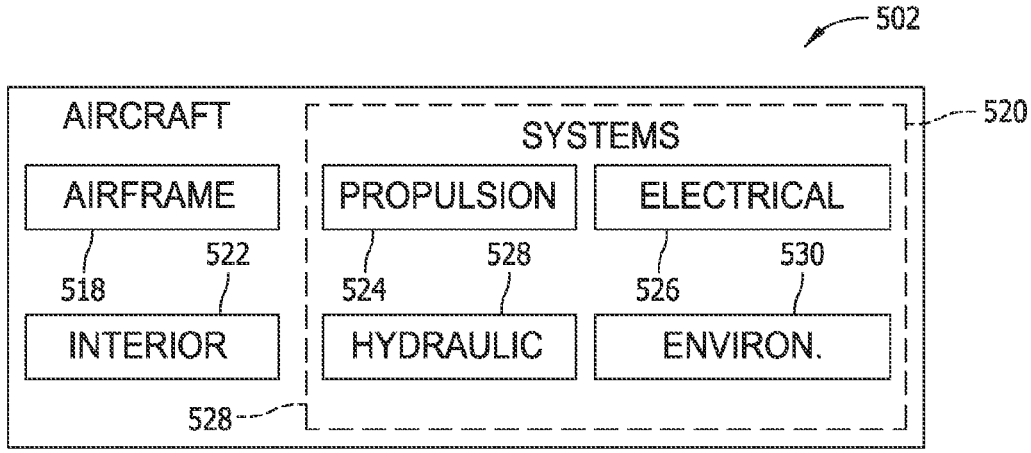
FIG. 5 is a block diagram of an aircraft.

With reference to FIGS. 4 and 5, implementations of this disclosure may be described in the context of an aircraft manufacturing and service method 400 as shown in FIG. 4 and an aircraft 502 as shown in FIG. 5. During pre-production, exemplary method 400 may include specification and design 404 of the aircraft 502 and material procurement 406. During production, component and subassembly manufacturing 408 and system integration 410 of the aircraft 502 takes place. Thereafter, the aircraft 502 may go through certification and delivery 412 in order to be placed in service 414. While in service by a customer, the aircraft 502 is scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 5, the aircraft 502 produced by exemplary method 400 may include an airframe 518 with a plurality of systems 520 and an interior 522. Examples of high-level systems 520 include one or more of a propulsion system 524, an electrical system 526, a hydraulic system 526, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 400. For example, components or subassemblies corresponding to production process 108 may be fabricated or manufactured in a manner similar to components or subassemblies produced while the aircraft 502 is in service. Also, one or more apparatus implementations, method implementations, or a combination thereof may be utilized during the production stages 408 and 410, for example, by substantially expediting assembly of or reducing the cost of an aircraft 502. Similarly, one or more of apparatus implementations, method implementations, or a combination thereof may be utilized while the aircraft 502 is in service, for example and without limitation, to maintenance and service 416.

It should be understood that components illustrated in FIGS. 1 and 2 can be separate from each other, as shown, or included within other components. For example, computer 202 may carry out functions that could otherwise be carried out by dedicated hardware.

Though computer 202 has been discussed herein, computer 202 may instead be, for example, one or more reduced instruction set circuits (RISC), one or more application specific integrated circuits (ASICs), one or more logic circuits, and/or any other circuit or processor capable of executing the functions described herein. Further, references to memory in this specification may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

When introducing elements of the present invention or the implementation(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

This written description uses examples to disclose the implementations, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A radiofrequency identification (RFID) device comprising:

an active RFID tag that includes a power source and tag identification (TID) data unique to the active RFID tag;
a passive-RFID tag reader, the passive-RFID tag reader electrically coupled to the power source of the active RFID tag, wherein the active RFID tag is configured to:
combine the TID data with data received from the passive-RFID tag reader into a combined data file; and
transmit the combined data file to an active tag reader; and
an optical detector electrically coupled to the active RFID tag and the passive-RFID tag reader, the optical detector configured to:
optically detect a condition; and
output location data to the active RFID tag based on the optically detected condition.

2. The RFID device according to claim 1, further comprising:
an antenna electrically coupled to the passive-RFID tag reader, the antenna configured to directionally send and receive a signal from a passive RFID tag; and
an antenna orientation device configured to orient the direction of the signal.

3. The RFID device according to claim 2, further comprising:
a transmission power control device configured to adjust a transmission power of the signal.

4. The RFID device according to claim 1, further comprising:
a location engine, the location engine configured to receive data from the active RFID tag and data from the passive-RFID tag reader, the location engine calculating a present location based upon the received data from the active RFID tag and passive-RFID tag reader.

5. The RFID device according to claim 1, wherein the condition is a barcode.

6. The RFID device according to claim 1, wherein the TID data includes the location data.

7. The RFID device according to claim 1, wherein the passive-RFID tag reader is configured to interrogate a passive RFID tag within a predetermined distance of the passive-RFID tag reader, and receive electronic product code (EPC) data from the interrogated tag.

8. The RFID device according to claim 7, wherein the passive-RFID tag reader transmits the EPC data to the active tag, and the active tag transmits the EPC data to the active tag reader as part of the combined data file.

9. The RFID device according to claim 1, wherein the power source of the active RFID tag is a battery sized to provide simultaneous electrical power to the active RFID tag and the passive-RFID tag reader.

10. A method of determining the location of an object coupled to a radiofrequency identification device, the method comprising:
interrogating a passive tag using a passive-RFID tag reader and receiving electronic product code (EPC) data from the passive tag;
transmitting the EPC data to an active RFID tag that is coupled to the passive RFID tag reader;
optically detecting a condition using an optical detector electrically coupled to the active RFID tag and the passive-RFID tag reader;
outputting location data from the optical detector to the active RFID tag based on the optically detected condition;
combining, at the active RFID tag, the EPC data with tag identification (TID) data unique to the active RFID tag to form a combined data file, wherein the TID data includes the location data;
transmitting the combined data file from the active RFID tag to an active RFID tag reader; and
determining the location of the object using the EPC data and TID data.

11. The method according to claim 10, wherein interrogating the passive RFID tag includes orienting an antenna to a predetermined direction.

12. The method according to claim 10, wherein optically detecting a condition comprises optically detecting a barcode.

13. The method according to claim 10, further comprising interrogating a plurality of passive RFID tags.

14. The method according to claim 10, further comprising supplying power to the active RFID tag and the passive-RFID tag reader from the same power source.

15. A system for determining the location of an object using radiofrequency identification (RFID), comprising:
an RFID device, including an active RFID tag that includes a power source, a passive-RFID tag reader electrically coupled to the power source of the active RFID tag and an optical detector electrically coupled to the active RFID tag and the passive-RFID tag reader;
wherein the optical detector is configured to optically detect a condition and output location data to the active RFID tag based on the optically detected condition:,
wherein the RFID device is configured to combine electronic product code (EPC) data received from the passive-RFID tag reader and tag identification (TID) data unique to the active RFID tag into a combined data file and transmit the combined data file, the TID data including the location data; and
an active RFID reader configured to receive the combined data file and determine a location of the RFID device based upon the received EPC data and active RFID data.

16. The system according to claim 15, wherein the RFID device further comprises:
an antenna electrically coupled to the passive-RFID tag reader, the antenna configured to directionally send and receive a signal from a passive RFID tag; and
an antenna orientation device configured to orient the direction of the signal.

17. The system according to claim 16, wherein the RFID device further comprises a transmission power control device configured to adjust a transmission power of the signal.

18. The system according to claim 15, wherein the condition is a barcode.

19. The system according to claim 15, wherein the passive-RFID tag reader is configured to interrogate a passive RFID tag within a predetermined distance.

20. The system according to claim 19, wherein the passive-RFID tag reader is configured to receive EPC data from at least one passive RFID tag and transmits the received EPC data to the active RFID tag.

* * * * *